United States Patent
Shetty et al.

(10) Patent No.: US 8,358,634 B1
(45) Date of Patent: Jan. 22, 2013

(54) DYNAMIC ASSIGNMENT OF WIRELESS COMMUNICATION OVERHEAD MESSAGING RESOURCES

(75) Inventors: Manoj Shetty, Overland Park, KS (US); Siddharth S. Oroskar, Overland Park, KS (US); Sachin R. Vargantwar, Overland Park, KS (US); Deveshkumar Narendrapratap Rai, Overland Park, KS (US); Debasish Sarkar, Irvine, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 637 days.

(21) Appl. No.: 12/402,256

(22) Filed: Mar. 11, 2009

(51) Int. Cl.
*H04J 3/00* (2006.01)
*H04W 4/00* (2009.01)
*H04W 24/00* (2009.01)

(52) U.S. Cl. .................... 370/337; 370/331; 455/456.1

(58) Field of Classification Search .................. 370/320, 370/328, 329, 330, 331, 341, 342, 395.21, 370/395.4, 395.42, 410; 455/436, 435.1, 455/452.2, 456.1, 457, 453
See application file for complete search history.

(56) References Cited

U.S. PATENT DOCUMENTS

| | | | |
|---|---|---|---|
| 4,551,852 A | 11/1985 | Grauel et al. | |
| 4,573,206 A | 2/1986 | Grauel et al. | |
| 7,260,079 B1 * | 8/2007 | Chapman et al. | 370/338 |
| 7,330,733 B2 * | 2/2008 | Harris et al. | 455/518 |
| 7,844,244 B2 * | 11/2010 | Tu | 455/343.4 |
| 2010/0150056 A1 * | 6/2010 | Iwai et al. | 370/328 |

OTHER PUBLICATIONS

U.S. Appl. No. 12/247,796, filed Oct. 8, 2008.

* cited by examiner

*Primary Examiner* — Hanh Nguyen

(57) ABSTRACT

What is disclosed is a method of operating a wireless communication system, wherein a series of repeating overhead time cycles each comprise a plurality of time slots, and wherein the wireless communication system exchanges overhead information with wireless communication devices during individual ones of the time slots. The method includes assigning one of the overhead time cycles to one of the wireless communication devices, wherein the one of the wireless communication devices monitors the overhead time slots during the assigned one of the overhead time cycles and does not monitor the overhead time slots during the non-assigned overhead time cycles. The method also includes exchanging user communications with the wireless communication devices, monitoring loading information for the overhead time cycles, and monitoring movement information of the one of the wireless communication devices. The method also includes processing the loading information for the overhead time cycles and the movement information of the one of the wireless communication devices to assign the one of the wireless communication devices to another one of the overhead time cycles, and wirelessly indicating the other assigned one of the overhead time cycles to the one of the wireless communication devices.

20 Claims, 6 Drawing Sheets

DYNAMIC ASSIGNMENT OF WIRELESS COMMUNICATION OVERHEAD MESSAGING RESOURCES

TECHNICAL FIELD

Aspects of the disclosure are related to the field of communications, and in particular, the handling of wireless communication overhead messaging resources in wireless communication networks.

TECHNICAL BACKGROUND

Wireless communication networks typically include wireless communication devices which, via a wireless communication system, communicate with further communication networks and equipment. The wireless communication system typically includes wireless access nodes and associated equipment to route communications over wireless links from the wireless communication devices to further communication networks, equipment, and destinations.

When wireless communication devices desire to initiate communication services with the wireless communication system, a registration process typically occurs. As a part of this registration process, the wireless communication devices are configured to receive overhead information via a randomly assigned overhead messaging cycle carried over control channels in each of the wireless links.

However, when many wireless communication devices attempt to receive communication services through the same access node, or when a wireless communication device uses a high portion of the overhead resources of a wireless link, overcrowding and poor performance can result.

OVERVIEW

What is disclosed is a method of operating a wireless communication system, wherein a series of repeating overhead time cycles each comprise a plurality of time slots, and wherein the wireless communication system exchanges overhead information with wireless communication devices during individual ones of the time slots. The method includes assigning one of the overhead time cycles to one of the wireless communication devices, wherein the one of the wireless communication devices monitors the overhead time slots during the assigned one of the overhead time cycles and does not monitor the overhead time slots during the non-assigned overhead time cycles. The method also includes exchanging user communications with the wireless communication devices, monitoring loading information for the overhead time cycles, and monitoring movement information of the one of the wireless communication devices. The method also includes processing the loading information for the overhead time cycles and the movement information of the one of the wireless communication devices to assign the one of the wireless communication devices to another one of the overhead time cycles, and wirelessly indicating the other assigned one of the overhead time cycles to the one of the wireless communication devices.

What is also disclosed is a communication system. The communication system includes a wireless communication system configured to exchange overhead information with wireless communication devices during individual ones of a plurality of time slots of a series of repeating overhead time cycles. The wireless communication system is configured to assign one of the overhead time cycles to one of the wireless communication devices. The one of the wireless communication devices is configured to monitor the overhead time slots during the assigned one of the overhead time cycles and not monitor the overhead time slots during the non-assigned overhead time cycles. The wireless communication system is configured to exchange user communications with the wireless communication devices, monitor loading information for the overhead time cycles, and monitor movement information of the one of the wireless communication devices. The wireless communication system is configured to process the loading information for the overhead time cycles and the movement information of the one of the wireless communication devices to assign the one of the wireless communication devices to another one of the overhead time cycles. The wireless communication system is configured to wirelessly indicate the other assigned one of the overhead time cycles to the one of the wireless communication devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
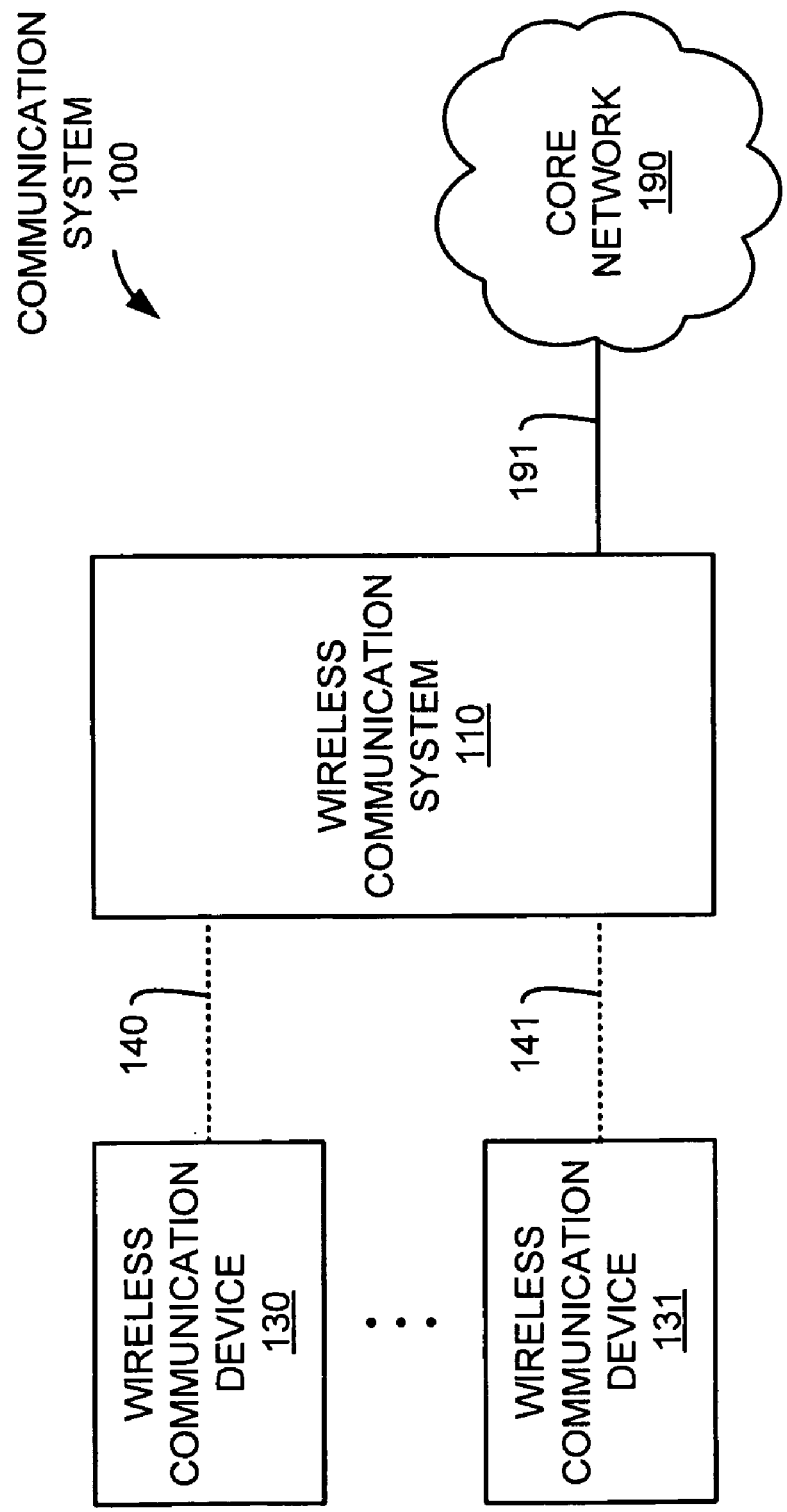
FIG. 1 is a system diagram illustrating a communication system.

FIG. 1 is a system diagram illustrating communication system 100. Communication system 100 includes wireless communication system 110, wireless communication devices 130-131, and core network 190. Wireless communication system 110 and wireless communication device 130 communicate over wireless link 140. Wireless communication system 110 and wireless communication device 131 communicate over wireless link 141. Wireless communication system 110 and core network 190 communicate over link 191.

Wireless communication system 110 includes wireless communications network equipment capable of communicating with wireless communication devices 130-131. Examples of wireless communication system 110 include base stations, base transceiver stations, boomer stations, radio node controllers (RNC), mobile switching centers, call processing equipment, wireless access nodes, wireless access points, telephone switches, routers, gateways, antennas, transceivers, computer processing equipment, microprocessors, as well as other type of communication and processing equipment, including combinations thereof. In many examples, wireless communication devices 130-131 receive communication service from a wireless access node within wireless communication system 110 over wireless links 140-141.

Wireless communication devices 130-131 each comprise a telephone, transceiver, computer, digital assistant, smart phone, Internet appliance, or some other wireless communication apparatus, including combinations thereof. Many examples of wireless communication devices 130-131 are mobile communication devices. Although communication system 100, as shown in FIG. 1, includes two wireless communication devices, it should be understood that in other examples, a different number of wireless communication devices could be in communication with wireless communication system 110.

Core network 190 includes an Internet network, wireless network, telephony network, optical network, enterprise network, local area network, packet data serving node, or (PDSN), or some other type of communication network or communication equipment, including combinations thereof. In some examples, core network 190 is a core network of a telecommunications provider.

Wireless links 140-141 each use various communication media, such as air, space, or some other wireless transport media, including combinations thereof. Wireless links 140-141 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), high speed packet access (HSPA), or some other communication format, including combinations, variations, or improvements thereof.

Wireless links 140-141 may each include many different signals sharing the same link. Wireless links 140-141 could each include multiple signals operating in a single "air-path"—as represented by the dashed lines in FIG. 1—comprising forward links, reverse links, beacon signals, user communications, communication sessions, overhead communications, frequencies, timeslots, transportation ports, logical transportation links, network sockets, packets, or communication directions. For example, communications and control signals between wireless communication device 130 and wireless communication system 110 could share the same wireless link 140, but be transferred over a forward link, reverse link, different communication sessions, frequencies, timeslots, packets, ports, sockets, logical transport links, or in different directions, including combinations thereof.

Each communication session established to and from wireless communication devices 130-131 with wireless communication system 110 could include bi-directional communications. For example, when the communication session established over wireless link 140 represents an outgoing call established by wireless communication device 130, the portions of the bi-directional wireless communications relating to the outgoing call that are transferred by wireless communication device 130 to wireless communication system 110, over wireless link 140, are considered the reverse link portions. Likewise, the portions of the bi-directional wireless communications relating to the outgoing call that are transferred by wireless communication system 110 to wireless communication device 130, over wireless link 140, are considered the forward link portions.

It should be understood that the dashed lines representing wireless links 140-141 are merely used to show wireless communication of each wireless communication device 130-131 with wireless communication system 110, and do not necessarily represent two fully separate wireless communication links. In many examples, wireless links 140-141 may share common elements between each other, such as overhead channels, control cycles, or other portions.

Link 191 uses various communication media, such as air, space, metal, optical fiber, or some other signal propagation path—including combinations thereof. Link 191 could be wired or wireless and could use communication protocols such as Internet, Internet protocol (IP), local-area network (LAN), optical networking, hybrid fiber coax (HFC), telephony, T1, or some other communication format, including combinations, improvements, or variations thereof. Link 191 could be a direct link or might include various equipment, intermediate components, systems, and networks. Link 191 could include multiple signals operating in a single pathway in a similar manner as wireless links 140-141.

Figure 2:
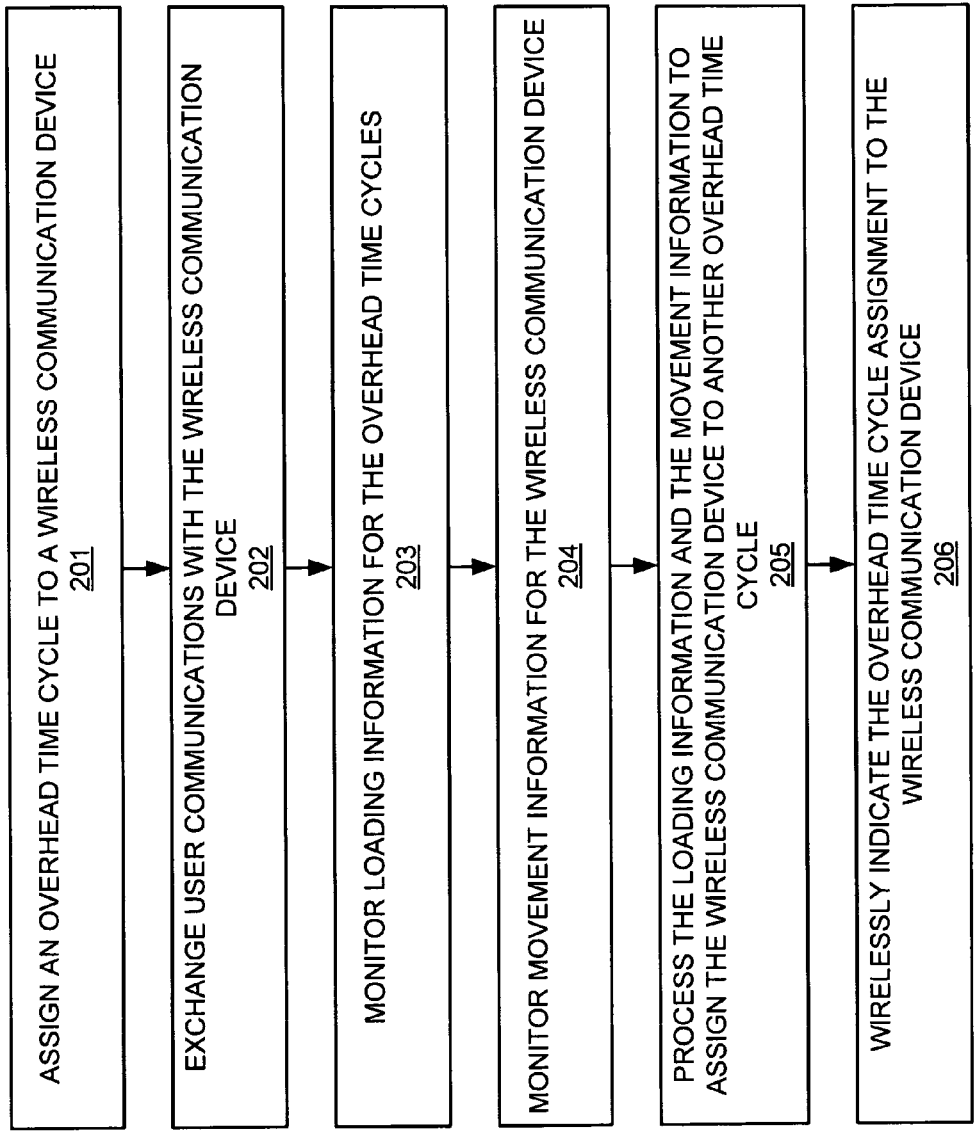
FIG. 2 is a flow diagram illustrating a method of operation of a communication system.

FIG. 2 is a flow diagram that illustrates a method of operation of communication system 100, as found in FIG. 1. The phases shown in FIG. 2 are indicated herein parenthetically. In FIG. 2, wireless communication system 110 assigns (201) an overhead time cycle to each wireless communication device 130-131. This assignment could be part of a registration process where each wireless communication device 130-131 registers for communication service with wireless communication system 110. In many examples, this assignment is done in a random fashion, or through the use of a hashing algorithm, to assign each wireless communication device 130-131 to an overhead time cycle. Also, depending upon the assignment process, wireless communication devices 130-131 could be assigned to a similar or different overhead time cycle from each other.

As mentioned above, wireless communication system 110 could receive a registration request from each wireless communication device 130-131 as part of a registration process for wireless communication services. The registration request could include, in some examples, a request to initiate a communication session by wireless communication devices 130-131 with wireless communication system 110. Other examples of the registration requests include a request by wireless communication devices 130-131 for access to wireless communication system 110.

The registration process varies based upon the particular wireless communication protocol employed. In example protocols such as CDMA or EV-DO, wireless communication devices 130-131 monitor a pilot channel portion of wireless links 140-141, respectively. Wireless communication devices 130-131 then could each receive registration information such as a spreading code, serial number, unicast access terminal identifier (UATI), communication session identifier, or other identifier, among other registration information. After the registration process has completed, user communications can be exchanged between wireless communication devices 130-131 and wireless communication system 110. It should be understood that the registration process could occur separately or at different times for each wireless communication device 130-131.

In a typical example of communication system 100, in addition to user communications, wireless communication system 110 is configured to exchange overhead information with wireless communication devices 130-131 throughout the communication services, user communications, sessions, or time of access by wireless communication devices 130-131. In some examples, this overhead information is exchanged in individual overhead messaging time slots of a series of repeating overhead time cycles, where each overhead time cycle includes many overhead messaging time slots. In many examples, the repeating overhead time cycles are a part of an overhead communication channel between wireless communication system 110 and each wireless communication device 130-131. This overhead communication channel could further be a part of wireless links 140-141, which could include many different communication channels, such as forward links and reverse links, between wireless communication system 110 and wireless communication devices 130-131.

In an example EV-DO protocol, the repeating overhead time cycles could be control cycles of a control channel of the EV-DO forward link from wireless communication system 110 to wireless communication devices 130-131. These control cycles could contain paging information for wireless communication devices 130-131. The pages could include call alerts, text messages, audio messages, or other information. Further examples of the overhead communication is discussed below and illustrated in FIG. 6.

Wireless communication system 110 indicates the overhead time cycle assignments to wireless communication devices 130-131. In many examples, the indication occurs over wireless links 140-141. Since, in typical examples, the overhead information is transferred repeatedly in a finite series of repeating overhead time cycles, wireless communication devices 130-131 could be each configured to monitor the overhead messaging time slots of the assigned overhead time cycles and not monitor the overhead messaging time slots of the non-assigned overhead time cycles.

Wireless communication system 110 exchanges (202) user communications with each wireless communication device 130-131 over wireless links 140-141. The user communications could be exchanged over different portions of wireless links 140-141. Wireless communication system 110 could further exchange the user communications with core network 190, among other systems and equipment.

Wireless communication system 110 monitors (203) loading information for the overhead time cycles during the exchange of user communications with wireless communication devices 130-131 over wireless links 140-141. The loading information could include, for example, a number of wireless communication devices sharing each overhead time cycle, an amount of overhead information being transferred in each overhead time cycle, or other information indicating a loading status of the overhead time cycle. Some examples include monitoring a page usage in each overhead time cycle for each wireless communication device assigned to the particular overhead time cycle over a period of time.

Wireless communication system 110 also monitors (204) movement information for wireless communication devices 130-131. In many examples, wireless communication devices 130-131 are mobile communication devices, and able to move throughout geographic regions serviced by wireless access nodes in wireless communication system 110. In other examples, wireless communication devices 130-131 could be stationary, or a combination thereof.

The movement information could include, in some examples, determining a geographic location of each wireless communication device 130-131. In some examples, wireless communication system 110 receives geographic location information for each wireless communication device 130-131 from each wireless communication device 130-131 and processes the location information to determine the movement information. In further examples, processing the movement information of each wireless communication device 130-131 includes processing the movement information to determine a speed and a direction of each wireless communication device 130-131.

In examples where wireless communication devices 130-131 each transfer a geographic location to wireless communication system 110, wireless communication devices 130-131 could each include global-positioning system (GPS) receivers to enable a determination of geographic location. In other examples, wireless communication devices 130-131 interface with external systems to determine geographic locations. In yet other examples, such as in stationary examples, the geographic locations of wireless communication devices 130-131 are predetermined and stored in a computer-readable medium or digital storage medium in wireless communication devices 130-131 or wireless communication system 110. In examples where the geographic location is determined by wireless communication system 110, a terrestrial position-determining equipment (PDE) system could be used to determine geographic locations of wireless communication devices 130-131. In other examples, a triangulation method is used, while in yet other examples, an emergency services location procedure system is used.

In examples where wireless communication devices 130-131 are mobile, wireless communication system 110 determines projected geographic paths of wireless communication devices 130-131. The projected geographic paths of wireless communication devices 130-131 could be determined by many possible methods, and based upon speed, direction, or other factors. In some examples, the projected geographic paths are determined by monitoring a first geographic location of each wireless communication device 130-131 and monitoring a second geographic location of each wireless communication device 130-131. Then, the first geographic locations and the second geographic locations are processed to determine traveled paths between the first geographic locations and the second geographic locations. The traveled paths are extrapolated to determine projected geographic paths, or trajectories.

In other examples, the projected geographic paths of wireless communication devices 130-131 are determined by monitoring geographic locations of each of wireless communication devices 130-131 and processing the geographic locations to determine if the geographic locations are associated with a mobility pattern. The projected geographic paths of wireless communication devices 130-131 are then determined based on the mobility pattern. A mobility pattern defines a pattern of motion of each of wireless communication devices 130-131, and could be determined using several factors. In some examples, these factors include determining if a geographic location is associated with predetermined routes, such as roads, highways, landmarks, terrain features, or other routes. Advantageously, a mobility pattern would allow for a determination of projected geographic paths with only one geographic location determined for each wireless communication device 130-131.

Wireless communication system 110 processes (205) the loading information and the movement information to assign wireless communication devices 130-131 to other overhead time cycles. For example, when loading or usage of a particular overhead time cycle exceeds a threshold level, wireless communication devices assigned to the particular overhead time cycle can be reassigned to different overhead time cycles. In other examples, when the level of service experienced by a particular wireless communication device drops to an unacceptable level, the particular wireless communication device could be reassigned to a different overhead time cycle to attempt to provide a higher level of service.

Furthermore, the movement information can be processed. For example, many times a wireless access node in wireless communication system 110 is experiencing high utilization of an overhead time cycle, or a particular wireless communication device is using many resources within the overhead time cycle and contributing to a high utilization of the overhead time cycle. Based solely upon loading information, wireless communication system 110 may determine to reassign the particular wireless communication device, or other wireless communication devices, to a different overhead time cycle. However, for example, the particular wireless communication device may be moving quickly through an area of wireless coverage associated with a wireless access node in wireless communication system 110. The particular wireless communication device would possibly leave the area of wireless coverage in a short period of time, and subsequently no longer be experiencing the high utilization of an overhead time cycle, or likewise contributing to the high utilization of a particular overhead time cycle. Thus, the movement information of wireless communication devices can be processed along with the loading information of the overhead time cycles.

As a further example, if the particular wireless communication device was in rapid motion through an area of wireless coverage, no reassignment could be performed, as the particular wireless communication device will be expected to leave the coverage area soon. Conversely, when the particular wireless communication device is determined to be stationary and remain in an area of wireless coverage for a longer duration, a reassignment to a different overhead time cycle could prove desirable. It should be understood that if a change in particular overhead time cycle assignment was determined to be not required for a particular wireless communication device, no changes would need to be made in the overhead time cycle assignment for that particular wireless communication device.

Wireless communication system 110 wirelessly indicates (206) the new overhead time cycle assignments to wireless communication devices 130-131. In many examples, the indication occurs over wireless links 140-141. Since, in typical examples, the overhead information is transferred repeatedly in a finite series of repeating overhead time cycles, wireless communication devices 130-131 could be each configured to monitor the overhead messaging time slots of the reassigned overhead time cycles and not monitor the overhead messaging time slots of the non-assigned overhead time cycles. In some examples, this new assignment could force a wireless communication device to re-register with wireless communication system 110 and subsequently be assigned the new overhead time cycle. It should be understood that if a change in particular overhead time cycle assignment was determined to be not required for a particular wireless communication device, no changes would need to be communicated to the particular wireless communication device.

Advantageously, by intelligently monitoring and re-assigning the limited resources of overhead messaging in wireless protocols, such as overhead time cycles, to wireless communication devices 130-131, based on at least the loading of the various overhead time cycles and the movement characteristics of wireless communication devices 130-131, a more balanced distribution can be achieved in the various overhead time cycles and associated time slots among wireless communication devices 130-131 and other wireless communication devices in communication with wireless communication system 110. Overloaded or unbalanced overhead time cycles can lead to latency in transferring overhead messages to wireless communication devices as well as a decrease in throughput of overhead messages, leading to delays in receiving user communications, messages, or even telephone calls that cannot be connected. Advantageously, a communication system configured as described herein can thus provide higher quality of service and better performance than randomly assigning or hashing wireless communication devices to overhead time cycles.

In addition to the loading of the overhead time cycles and the movement of the wireless communication devices, other factors could also be considered. These factors could include, for example, a quality of service level of the wireless communication devices, a service-level agreement (SLA), the application type of the user communications, data traffic patterns, a user type of the wireless communication devices, or other factors, including combinations thereof.

In further examples, the overhead time cycles could be partitioned or reserved for specific uses, applications, or user types. For example, an emergency services user type, such as fire fighters, could be assigned to a specific overhead time cycle reserved for emergency services purposes. Advantageously, partitioning such emergency services from other user types could provide a higher priority or higher level of service. In other examples, the application type of the user communications could be considered. For example, an application type of voice calls could be configured to receive overhead information during a certain overhead time cycle which provides a high level of service, whereas an application type of Internet traffic could be configured to receive overhead information during a certain overhead time cycle which provides a different level of service.

An application type includes a user service or user communications as implemented in communications transferred between wireless communication devices 130-131 and wireless communication system 110. The user services, for example, could include Internet communications, voice calls, telephony, video, audio, email, text, chat data, web pages, peer-to-peer (P2P) communications, Voice over IP (VoIP), as well as other data and application types—including combinations thereof. The application could also be distinguished among different application service providers, even though such application service providers are providing similar types of user services. For example, although Voice over IP (VoIP) is a type of user service, various application service providers, could also be distinguished from each other, much like the individual user services.

Figure 3:
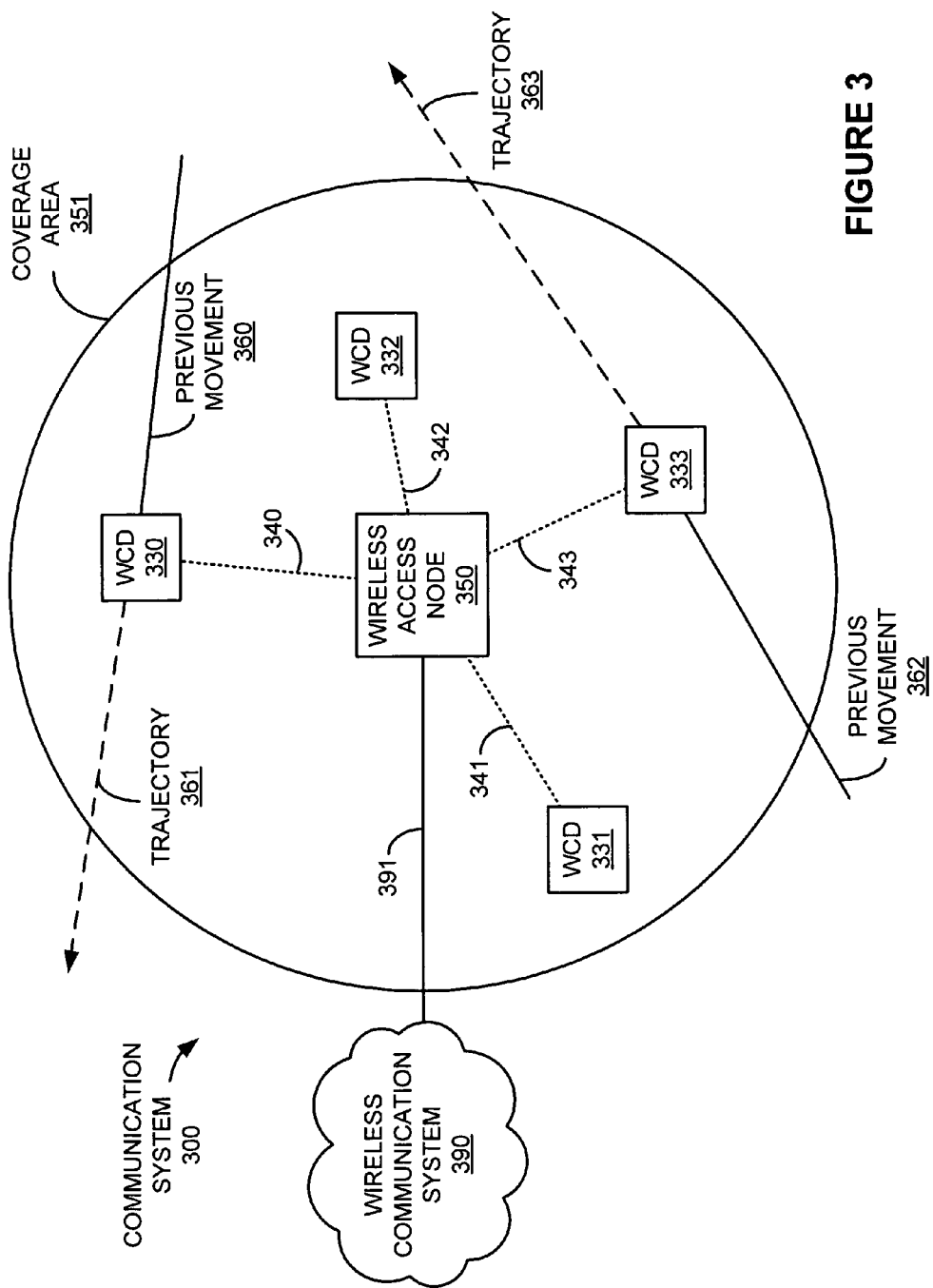
FIG. 3 is a system diagram illustrating a communication system.

FIG. 3 is a system diagram illustrating communication system 300. Communication system 300 includes wireless access node 350, wireless communication devices (WCDs) 330-333, and wireless communication system 390. FIG. 3 also shows coverage area 351 associated with wireless access node 350. Wireless access node 350 and WCDs 330-333 communicate over wireless links 340-343, respectively. Wireless access node 350 and wireless communication system 390 communicate over link 391. Although not shown in FIG. 3 for clarity, communication system 300 could also include further wireless access nodes, core networks, or other communication equipment and systems.

Wireless communication system 390 could include radio node controllers (RNC), mobile switching centers, gateways, call processing equipment, an Internet network, wireless networks, telephony networks, optical networks, enterprise networks, local area networks, packet data serving nodes, or (PDSN), or some other type of communication network or communication equipment, including combinations thereof. In some examples, wireless communication system 390 is a core network of a telecommunications provider, such as a wireless communication network.

Wireless access node 350 includes wireless communications equipment capable of communicating with and providing communication service to WCDs 330-333. Examples of wireless access node 350 can include base stations, base transceiver stations, boomer stations, call processing equipment, wireless access points, routers, gateways, as well as other type of communication equipment, including combinations thereof. Wireless access node 350 could also include computer processing equipment, microprocessors, digital storage equipment, or other processing equipment.

Wireless access node 350 has a limited geographic range over which it can provide communication services to wireless communication devices. The limited range over which wireless access node 350 can support communications with wireless communication devices is indicated by coverage area 351. In this example, the limited range is a function of the limitations of the wireless communication protocol employed. Although a circular region defining coverage area 351 is shown in FIG. 3, it should be understood that coverage area 351 could be of other shapes and configurations, as determined by geographic features, empirical data, the equipment wireless access node 350, or by other factors, including combinations thereof.

WCDs 330-333 are shown presently located within coverage area 351 of wireless access node 350. Examples of WCDs 330-333 could include telephones, transceivers, computers, digital assistants, smart phones, Internet appliances, or other wireless communication apparatuses, including combinations thereof. WCDs 330-333 could also each include global-positioning system (GPS) receivers to enable a determination of geographic location. In this example, WCD 330 and WCD 333 are mobile communication devices, and WCD 331-332 are stationary. As illustrated by the dashed and arrowhead lines, WCD 330 is shown with previous movement 360 and trajectory 361, and WCD 333 is shown with previous movement 362 and trajectory 363. Although communication system 300, as shown in FIG. 3, includes four WCDs, it should be understood that in other examples, a different number of WCDs could be in communication with wireless access node 350.

Wireless links 340-343 use the EV-DO protocol in this example. Link 391 is a T1 connection in this example. It should be understood that wireless links 340-343 could each include many different signals sharing the same link, as described above for wireless links 140-141 in FIG. 1. It should also be understood that the dashed lines representing wireless links 340-343 are merely used to show wireless communication between each WCD 330-333 with wireless access node 350, and do not necessarily imply a fully separate wireless communication link. In many examples, wireless links 340-343 may share common elements between each other, such as overhead channels, control cycles, or other portions.

Figure 4:
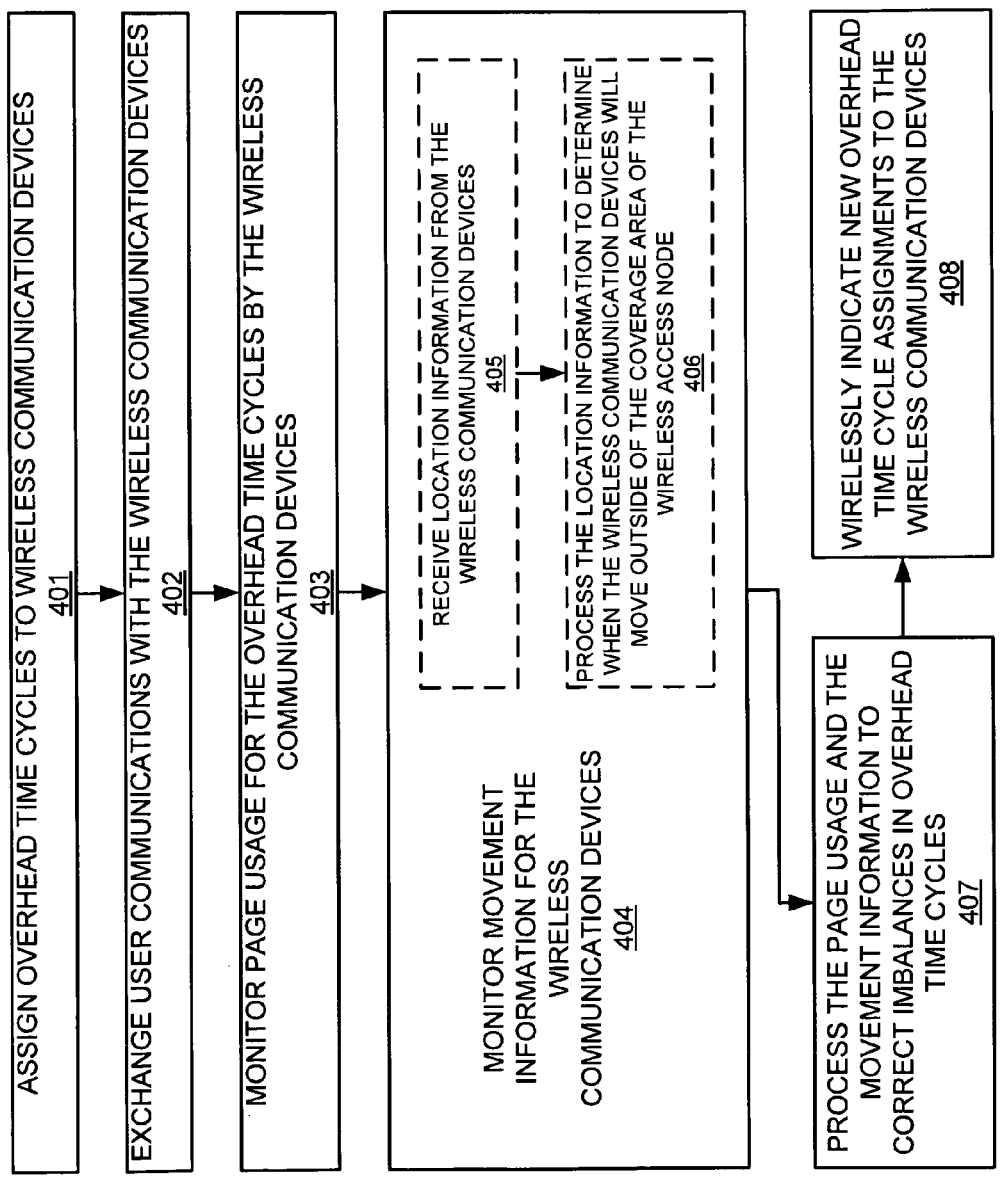
FIG. 4 is a flow diagram illustrating a method of operation of a communication system.

FIG. 4 is a flow diagram that illustrates a method of operation of communication system 300, as found in FIG. 3. The phases shown in FIG. 4 are indicated herein parenthetically. In FIG. 4, wireless access node 350 assigns (401) overhead time cycles to each wireless communication device (WCD) 330-333. In this example, the assignment is part of a registration process where each WCD 330-333 registers for communication service with wireless access node 350. In many examples, this assignment is done through the use of a randomizing hashing algorithm to assign each WCD 330-333 to an overhead time cycle. Also, depending upon the assignment process, WCD 330-333 could be assigned to a similar or different overhead time cycle from each other.

In some examples, instead of the initial assignment of the overhead time cycles for WCD 330-333 being performed in a random fashion, or through the use of a hashing algorithm, other factors could be considered. These other factors could include present loading of the overhead time cycles, service level agreements, application types of the desired user communications, or other factors. Thus, the overhead time cycles could be initially assigned based upon processing other factors upon registration.

As mentioned above, wireless access node 350 receives a registration request from each WCD 330-333 as part of a registration process for wireless communication services. The registration request could include, in some examples, a request to initiate a communication session by WCD 330-333 through wireless access node 350 with wireless communication system 390. Other examples of the registration requests include a request by WCD 330-333 for access to wireless communication system 390 through wireless access node 350.

The registration process varies based upon the particular wireless communication protocol employed, which in this example is EV-DO. In EV-DO examples, WCD 330-333 monitor a pilot channel portion of wireless links 340-343, respectively. WCD 330-333 then each receive registration information such as a spreading code, serial number, unicast access terminal identifier (UATI), communication session identifier, or other identifier, among other registration information. After the registration process has completed, user communications can be exchanged between WCD 330-333 and wireless communication system 390 through wireless access node 350. It should be understood that the registration process could occur separately or at different times for each WCD 330-333.

In a typical example of communication system 300, in addition to user communications, wireless access node 350 is configured to exchange overhead information with WCD 330-333 throughout the communication services, user communications, sessions, or time of access by WCD 330-333. In many examples, this overhead information is exchanged in individual overhead messaging time slots of a series of repeating overhead time cycles, where each overhead time cycle includes many overhead messaging time slots. As this example uses an EV-DO protocol, the repeating overhead time cycles could be control cycles of a control channel of the EV-DO forward link from wireless access node 350 to WCD 330-333. These control cycles are also used to transfer paging information for WCD 330-333. The pages could include call alerts, text messages, audio messages, or other information. Further examples of the overhead communication is discussed below and illustrated in FIG. 6.

Wireless access node 350 indicates the overhead time cycle assignments to WCD 330-333 over wireless links 340-343. Since, in this example, the overhead information is transferred repeatedly in a finite series of repeating overhead time cycles, WCD 330-333 are each configured to monitor the overhead messaging time slots of the assigned overhead time cycles and not monitor the overhead messaging time slots of the non-assigned overhead time cycles.

Wireless access node 350 exchanges (402) user communications with each WCD 330-333 over wireless links 340-343. The user communications could be exchanged over different portions of wireless links 340-343. Wireless access node 350 could further exchange the user communications with wireless communication system 390, among other systems and equipment.

Wireless access node 350 monitors (403) page usage information for the overhead time cycles during the exchange of user communications with WCD 330-333 over wireless links 340-343. The page usage information could include, for example, a number of wireless communication devices sharing each overhead time cycle, an amount of pages being transferred in each overhead time cycle, or other information indicating a page usage status of the overhead time cycles.

Wireless access node 350 also monitors (404) movement information for WCD 330-333. In this example, WCD 330 and WCD 333 are mobile communication devices, and able to move throughout coverage area 351 serviced by wireless access node 350. Also in this example, WCD 331-332 are stationary, and remain generally in the same place for a longer period of time in coverage area 351.

In some examples, wireless access node 350 receives (405) location information for each WCD 330-333 from each WCD 330-333 and processes (406) the location information to determine the movement information. In further examples, processing the movement information of each WCD 330-333 includes processing the location information or movement information to determine a speed and a direction of each WCD 330-333.

Since WCD 330 and WCD 333 are mobile, wireless access node 350 determines previous movements 360 and 362, respectively, of WCD 330 and WCD 333. In this example, wireless access node 350 also determines projected geographic paths of WCD 330 and WCD 333, such as trajectories 361 and 363. Trajectories 361 and 363 of WCD 330 and WCD 333 could be determined by many possible methods, and based upon speed, direction, or other factors. In some examples, trajectories 361 and 363 are determined by monitoring a first geographic location of each of WCD 330 and WCD 333 and monitoring a second geographic location of each of WCD 330 and WCD 333 to determine previous movements 360 and 362. Then, previous movements 360 and 362 are processed to extrapolate trajectories 361 and 363. These trajectories 361 and 363 could be further processed (406) to determine when WCD 330 and WCD 333 will move outside of coverage area 351 of wireless access node 350.

Wireless access node 350 processes (407) the loading information and the movement information to possibly assign WCD 330-333 to other overhead time cycles to correct imbalances in the overhead time cycles. For example, when page usage of a particular overhead time cycle exceeds a threshold level, wireless communication devices assigned to the particular overhead time cycle can be reassigned to different overhead time cycles. In other examples, when the level of service experienced by a particular wireless communication device drops to an unacceptable level, the particular wireless communication device could be reassigned to a different overhead time cycle to attempt to provide a higher level of service.

Furthermore, the movement information is processed. For example, wireless access node 350 may be experiencing high utilization of an overhead time cycle, or a particular wireless communication device is using many resources within the overhead time cycle and contributing to a high utilization of an overhead time cycle. Based solely upon page usage information, wireless access node 350 may determine to reassign the particular wireless communication device, or other wireless communication devices, to a different overhead time cycle. However, for example, the particular wireless communication device may be moving quickly through coverage area 351 of wireless access node 350. The particular wireless communication device would possibly leave the area of wireless coverage in a short period of time, and subsequently no longer be experiencing the high utilization of an overhead time cycle, or likewise contributing to the high utilization of a particular overhead time cycle. Thus, the movement information of wireless communication devices can be processes along with the page usage of the overhead time cycles.

As shown in FIG. 3, WCD 330 and WCD 333 are mobile communication devices, and WCD 331-332 are stationary. Assume, for example, that WCD 330-333 all share the same overhead time cycle. Then, referencing table 500 in FIG. 5, WCD 330 is shown having 60 page usages and being presently mobile. WCD 331 is shown having 40 page usages and being presently stationary. WCD 332 is shown having 34 page usages and being presently stationary. WCD 333 is shown having 21 pages and being presently mobile. Based solely upon page usage, WCD 330 is contributing to the loading of the particular overhead time cycle the most. However, when both page usage and movement are considered, WCD 330 may have a high page usage, but is also in motion through coverage area 351. Since trajectory 361 shows WCD 330 leaving coverage area 351, wireless access node 350 could determine that reassigning WCD 330 to another overhead time cycle to alleviate a page usage imbalance would be unnecessary in the long term.

In this example, WCD 331 is stationary and also has a high page usage of 40. Since WCD 331 may remain active in coverage area 351 for a longer period of time, WCD 331 may benefit from reassignment to another, perhaps less crowded, overhead time cycle. Likewise, other wireless communication devices could benefit by having WCD 331 moved to another overhead time cycle as more resources could be freed up for the other wireless communication devices to utilize. Other determinations could be made for WCD 332 and WCD 333, depending upon their page usage and movement information.

Wireless access node 350 wirelessly indicates (408) the new overhead time cycle assignments to WCD 330-333 over wireless links 340-343. Since, in this example, the overhead information is transferred repeatedly in a finite series of repeating overhead time cycles, WCD 330-333 are each configured to monitor the overhead messaging time slots of the assigned overhead time cycles and not monitor the overhead messaging time slots of the non-assigned overhead time cycles. In some examples, this new assignment could force a wireless communication device to re-register with wireless access node 350 and subsequently be assigned the new overhead time cycle. It should be understood that if a change in particular overhead time cycle assignment was determined to be not required for a particular wireless communication device, no changes would need to be communicated to the particular wireless communication device.

Figure 5:
FIG. 5 is a table illustrating example movement and page usages of wireless communication devices.

FIG. 5 shows table 500 illustrating example movement and page usage status of WCDs 330-333. In table 500, each row shows information related to a different WCD 330-333. The first column indicates the particular WCD 330-333. The second column indicates the number of page usages associated with each WCD 330-333. Then third and final column indicates the movement status of each WCD 330-333. It should be understood that the quantities shown in table 500 are merely used to represent an example of WCD 330-333

In this example, table 500 shows WCDs in descending order based upon the number of page usages associated with each WCD. WCD 330 is shown having 60 page usages and being presently mobile. WCD 331 is shown having 40 page usages and being presently stationary. WCD 332 is shown having 34 page usages and being presently stationary. WCD 333 is shown having 21 pages and being presently mobile.

Figure 6:
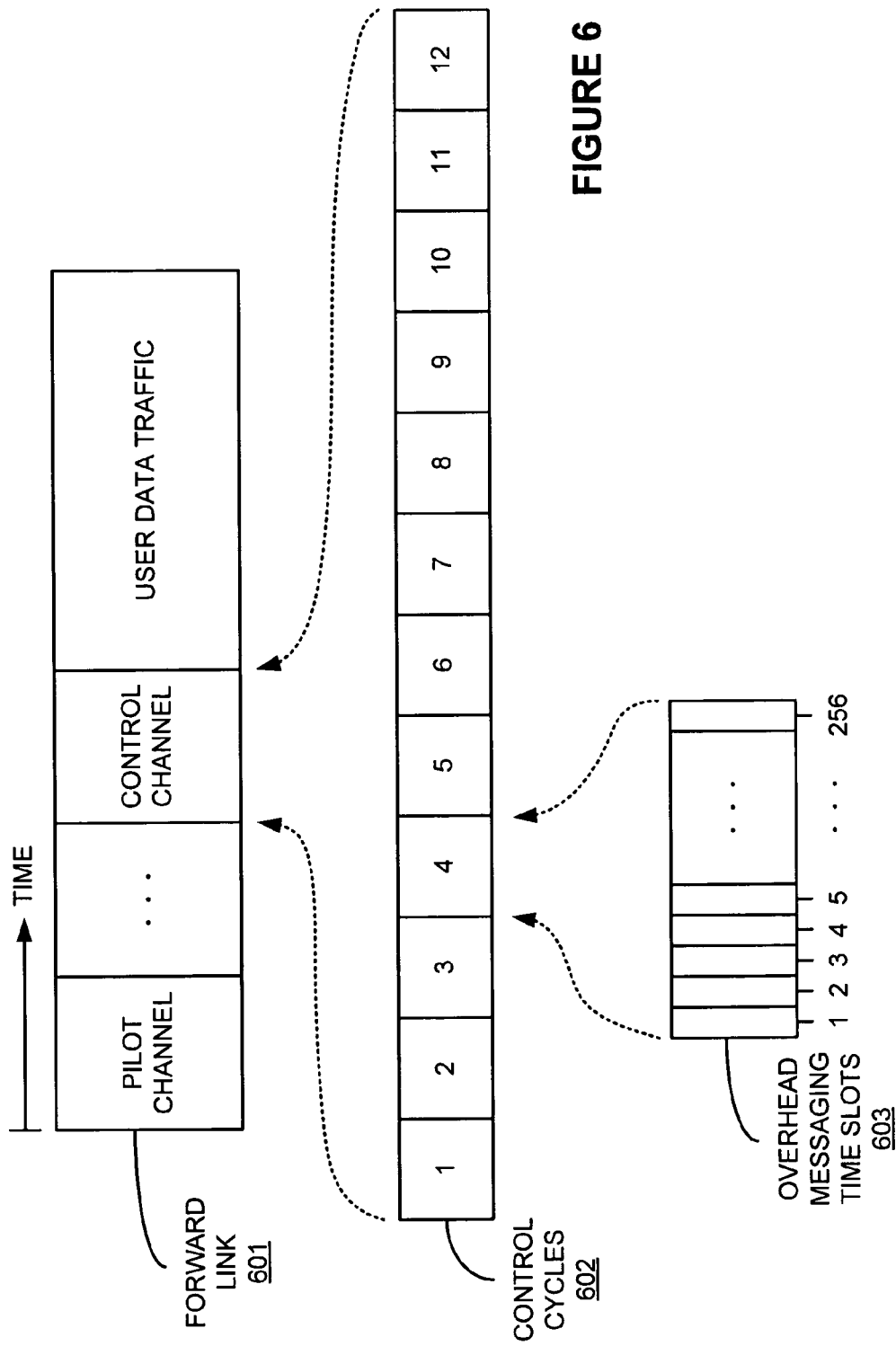
FIG. 6 is a diagram illustrating a forward link in a wireless communication system.

FIG. 6 is a diagram illustrating an example of a forward link portion of wireless links 340-343, as found in FIG. 3, although wireless links 340-343 could use other configurations. Wireless links 140-141 could also incorporate features of the forward link described in FIG. 6. FIG. 6 illustrates forward link 601, control cycles 602, and overhead messaging time slots 603.

Forward link 601 includes several time-wise portions, with time increasing to the right, as shown by the arrowhead above forward link 601. In forward link 601, a pilot channel, control channel, and user data traffic portion are shown, although additional portions could also be in forward link 601. The forward link sequence is typically repeated continuously to effectuate communication service from wireless access node 350 to WCD 330-333 over wireless links 340-343. In further examples, a reverse link of wireless links 340-343 could exist to facilitate communication service from WCD 330-333 to wireless access node 350. Other examples of forward link 601 could include frequency-wise portions, or other configurations, including combinations thereof.

The pilot channel includes information related to wireless access node 350 and the service provider of communication system 300 used in the registration process of each WCD 330-333. The user data traffic portion includes user communications, such as voice call data, web pages, email, among other information. The control channel includes information related to overhead information of wireless links 340-343 and overhead information of the associated communication services. The control channel could include broadcast portions applicable to all wireless communication devices in communication with wireless access node 350, and portions specific to WCD 330-333 or other wireless communication devices. In some examples, this overhead information includes quick configuration messages, access parameters, or sector parameters. In other examples, the control cycles include paging information for wireless communication devices. The pages could include call alerts, text messages, audio messages, or other information.

In the example shown in FIG. 6, control cycles 602 includes 12 control cycles. Each of the control cycles are distinct, with possibly different content, in the control channel of forward link 601. Also, included in each control cycle 1-12 are overhead messaging time slots 603. In this example, 256 time slots are included in each control cycle 1-12. Each overhead messaging time slot 1-256 includes overhead information.

Since, as described herein, a wireless communication device will be assigned to a particular control cycle, only the time slots within the assigned control cycle will be monitored by the wireless communication device. Additionally, the individual time slots 1-256 for each control cycle 1-12 could also have information which allows a wireless communication device to determine if the time slot is relevant to the particular wireless communication device. In some cases, some time slots will be broadcast information applicable to many wireless communication devices, while in other cases, some time slots will be intended for a specific wireless communication device. The overhead messaging information as described herein will, in typical examples, be found within the individual time slots.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, wherein a series of repeating overhead time cycles each comprise a plurality of time slots, and wherein the wireless communication system exchanges overhead information with wireless communication devices during individual ones of the time slots, the method comprising:
    assigning one of the overhead time cycles to one of the wireless communication devices, wherein the one of the wireless communication devices monitors the overhead time slots during the assigned one of the overhead time cycles and does not monitor the overhead time slots during the non-assigned overhead time cycles;
    exchanging user communications with the wireless communication devices;
    monitoring loading information for the overhead time cycles;
    monitoring movement information comprising a speed and a direction of the one of the wireless communication devices in a first wireless coverage area;
    processing the movement information to determine a time period that the one of the wireless communication devices is projected to remain within the first wireless coverage area;
    processing the loading information for the overhead time cycles and the time period that the one of the wireless communication devices is projected to remain within the first wireless coverage area to assign the one of the wireless communication devices to another one of the overhead time cycles;
    wirelessly indicating the other assigned one of the overhead time cycles to the one of the wireless communication devices.

2. The method of claim 1, wherein monitoring loading information for the overhead time cycles comprises monitoring page usage of each of the wireless communication devices.

3. The method of claim 1, further comprising:
    receiving location information for the one of the wireless communication devices from the one of the wireless communication devices; and
    processing the location information for the one of the wireless communication devices to determine the movement information.

4. The method of claim 1, wherein processing the movement information of the one of the wireless communication devices comprises processing the movement information to determine a projected geographic path of the one of the wireless communication devices.

5. The method of claim 4, further comprising:
    processing the speed and the direction of the one of the wireless communication devices to determine when the one of the wireless communication devices will move outside of a coverage area of a wireless access node serving the one of the wireless communication devices.

6. The method of claim 1, wherein processing the movement information of the one of the wireless communication devices comprises determining when the one of the wireless communication devices is stationary.

7. The method of claim 1, further comprising:
    processing a service level agreement of the one of the wireless communication devices, the loading information for the overhead time cycles, and the movement information of the one of the wireless communication devices to assign the one of the wireless communication devices to another one of the overhead time cycles.

8. The method of claim 1, further comprising:
processing an application type of the user communications of the one of the wireless communication devices, the loading information for the overhead time cycles, and the movement information of the one of the wireless communication devices to assign the one of the wireless communication devices to another one of the overhead time cycles.

9. The method of claim 1, wherein the overhead time cycles are control cycles within a control channel of an evolution data optimized (EV-DO) forward wireless link.

10. The method claim 1, wherein the overhead information is at least quick configuration messages, access parameter messages, and sector parameter messages of control cycles within a control channel of an evolution data optimized (EV-DO) forward wireless link.

11. A communication system, comprising:
a wireless communication system configured to exchange overhead information with wireless communication devices during individual ones of a plurality of time slots of a series of repeating overhead time cycles;
the wireless communication system configured to assign one of the overhead time cycles to one of the wireless communication devices;
the one of the wireless communication devices configured to monitor the overhead time slots during the assigned one of the overhead time cycles and not monitor the overhead time slots during the non-assigned overhead time cycles;
the wireless communication system configured to exchange user communications with the wireless communication devices, monitor loading information for the overhead time cycles, and monitor movement information comprising a speed and a direction of the one of the wireless communication devices in a first wireless coverage area;
the wireless communication system configured to process the movement information to determine a time period that the one of the wireless communication devices is projected to remain within the first wireless coverage area;
the wireless communication system configured to process the loading information for the overhead time cycles and the time period that the one of the wireless communication devices is projected to remain within the first wireless coverage area to assign the one of the wireless communication devices to another one of the overhead time cycles;
the wireless communication system configured to wirelessly indicate the other assigned one of the overhead time cycles to the one of the wireless communication devices.

12. The communication system of claim 11, comprising:
the wireless communication system configured to monitor page usage of each of the wireless communication devices.

13. The communication system of claim 11, comprising:
the wireless communication system configured to receive location information for the one of the wireless communication devices from the one of the wireless communication devices, and process the location information for the one of the wireless communication devices to determine the movement information.

14. The communication system of claim 11, comprising:
the wireless communication system configured to process the movement information to determine a projected geographic path of the one of the wireless communication devices.

15. The communication system of claim 14, comprising:
the wireless communication system configured to process the speed and the direction of the one of the wireless communication devices to determine when the one of the wireless communication devices will move outside of a coverage area of a wireless access node serving the one of the wireless communication devices.

16. The communication system of claim 11, comprising:
the wireless communication system configured to determine when the one of the wireless communication devices is stationary.

17. The communication system of claim 11, comprising:
the wireless communication system configured to process a service level agreement of the one of the wireless communication devices, the loading information for the overhead time cycles, and the movement information of the one of the wireless communication devices to assign the one of the wireless communication devices to another one of the overhead time cycles.

18. The communication system of claim 11, comprising:
the wireless communication system configured to process an application type of the user communications of the one of the wireless communication devices, the loading information for the overhead time cycles, and the movement information of the one of the wireless communication devices to assign the one of the wireless communication devices to another one of the overhead time cycles.

19. The communication system of claim 11, wherein the overhead time cycles are control cycles within a control channel of an evolution data optimized (EV-DO) forward wireless link.

20. The communication system of claim 11, wherein the overhead information is at least quick configuration messages, access parameter messages, and sector parameter messages of control cycles within a control channel of an evolution data optimized (EV-DO) forward wireless link.

* * * * *